June 16, 1925.

L. H. SPRINKLE

ARTIFICIAL TOOTH

Filed May 14, 1924

1,542,535

INVENTOR
Lake H. Sprinkle

BY Israel Benjamins.
ATTORNEY

Patented June 16, 1925.

1,542,535

UNITED STATES PATENT OFFICE.

LAKE H. SPRINKLE, OF BROOKLYN, NEW YORK.

ARTIFICIAL TOOTH.

Application filed May 14, 1924. Serial No. 713,226.

*To all whom it may concern:*

Be it known that I, LAKE H. SPRINKLE, a citizen of the United States, residing at 86 Greene Avenue, Brooklyn, in the county of Kings and State of New York, have invented new and useful Improvements in Artificial Teeth, of which the following is a specification.

My invention relates to artificial teeth and facings, which may be made of porcelain or any other suitable material, and having on the lingual side thereof a means for connecting the same to the plate or backing.

One of the objects of my invention is to have a perfected means for connecting the tooth or facing to the plate or backing, and to have the same durable and inexpensive.

Another object is to have the said connecting means formed of a blank of metal into a shape having a high resistance to bending.

Other objects and advantages will hereinafter appear.

These objects may be attained by the artificial tooth or facing, two forms of which are illustrated in the accompanying drawing, or by any mechanical equivalent or obvious modification of the same.

In the drawings Fig. 1 is a plan of a blank of metal before it is formed into a hollow pin connection for my improved tooth or facing.

Similar numerals refer to similar parts throughout the several views.

Figure 1:
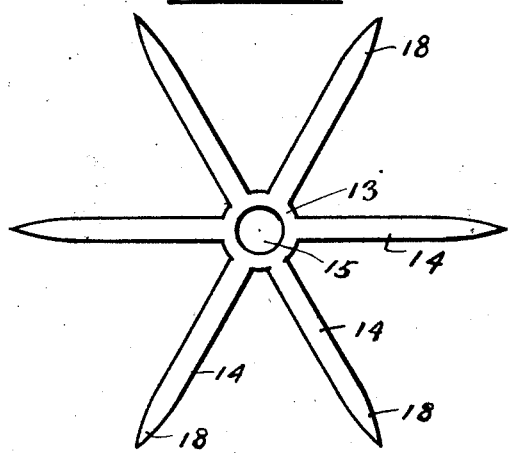
Figure 2:
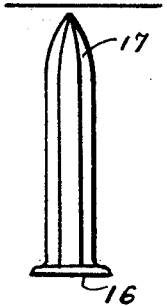
Fig. 2 is an elevation of one form of the hollow pin after it is formed from the blank shown in Fig. 1 into a shape to be connected to a facing or tooth.
Figure 3:
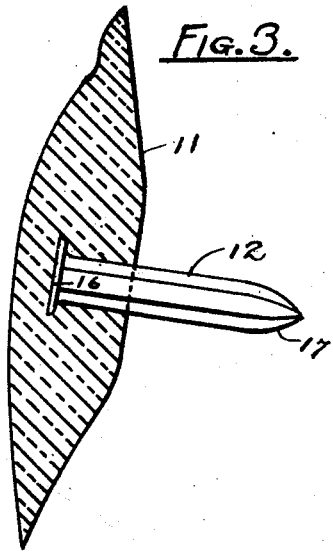
Fig. 3 is a vertical section of one form of my improved tooth or facing showing one of the hollow pins in position before it is connected to the backing of the bridge.
Figure 4:
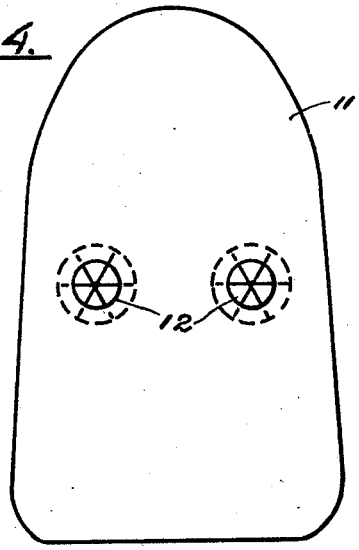
Fig. 4 is a rear view of my improved tooth or facing, looking from right to left in Fig. 3 and showing the two hollow pins in position.

11 designates the tooth or facing, which is shown in Fig. 3 as having anchored therein the hollow pin 12, which is pointed at the outer end thereof for conveniently connecting thereto the gold sheet of the backing of a bridge.

The pin 12 is formed from a blank 13, which has thereon the leaves or prongs 14 and the central opening 15 which is provided for the purpose of having passed therethrough a mandril or core to be used in one of the steps or operations of forming the pin 12.

The leaves 14 are tapered as at 18, to form the apex 17 of the pin 12 when brought to shape by pressure or punching and the central part of the blank 13 with the inner ends of the leaves 14 may be formed into the rim 16 of the pin 12.

The pins 12 are imbedded in the material of the tooth or facing 11 before they are hardened by baking or otherwise, and the rim 16 serves as an anchor for each of the pins 12.

It is evident that the pin 12 being hollow at the core will have a greater resistance to bending than a solid pin of the same weight.

The porcelain or other material of the tooth or facing 11 will also pass into the interior of the pin 12, during the operation of molding of the tooth or facing, thereby causing the tooth or facing 11 to hold the hollow pin 12 more securely than a solid pin could be held by it.

Variations are possible in the details of my improvement and some of its features may be used without the others.

I do not therefore restrict myself to the details as shown; but I intend to include also all mechanical equivalents and reasonably obvious modifications of the same, within the scope of my invention.

I claim as my invention and desire to secure by Letters Patent:

1. In an artificial tooth or facing a hollow pin imbedded in the lingual side thereof, said pin being formed of a blank having thereon multiple radially disposed leaves to be assembled into the body of the pin.

2. In an artificial tooth or facing a hollow pin imbedded in the lingual side thereof, said pin being formed of a blank having thereon multiple pointed leaves to be assembled into the body of the pin, the pointed portions of said leaves forming the apex of the pin.

3. In an artificial tooth or facing a hollow pin imbedded in the lingual side thereof, said pin being formed of a blank having thereon multiple leaves and a central part, said leaves to be assembled into the body of the pin, and said central part to form a rim at the inner end of the pin to be anchored in the body of the said tooth or facing.

LAKE H. SPRINKLE.